United States Patent
Nakabayashi

(10) Patent No.: US 7,201,513 B2
(45) Date of Patent: Apr. 10, 2007

(54) TEMPERATURE SENSOR

(75) Inventor: Hideki Nakabayashi, Nagoya (JP)

(73) Assignee: Denso Corporation, Kariya (JP)

( * ) Notice: Subject to any disclaimer, the term of this patent is extended or adjusted under 35 U.S.C. 154(b) by 86 days.

(21) Appl. No.: 11/052,060

(22) Filed: Feb. 8, 2005

(65) Prior Publication Data

US 2005/0185696 A1    Aug. 25, 2005

(30) Foreign Application Priority Data

Feb. 19, 2004    (JP)    ............... 2004-043236

(51) Int. Cl.
 *G01K 1/08*    (2006.01)
 *G01K 1/14*    (2006.01)
 *G01D 11/24*    (2006.01)
(52) U.S. Cl. .................. 374/208; 374/163; 73/866.5
(58) Field of Classification Search ............... 374/208, 374/163; 73/866.5
 See application file for complete search history.

(56) References Cited

U.S. PATENT DOCUMENTS

| | | | | |
|---|---|---|---|---|
| 5,660,473 A | * | 8/1997 | Noma et al. ............ | 374/145 |
| 5,741,072 A | * | 4/1998 | Yamaguchi et al. ...... | 374/179 |
| 5,749,656 A | * | 5/1998 | Boehm et al. ............ | 374/185 |
| 5,753,835 A | * | 5/1998 | Gustin .................... | 73/866.5 |
| 5,829,880 A | * | 11/1998 | Diedrich ................. | 374/208 |
| 5,835,546 A | * | 11/1998 | Stapleton ................ | 376/203 |
| 6,588,931 B2 | * | 7/2003 | Betzner et al. .......... | 374/185 |
| 6,607,302 B2 | * | 8/2003 | Lyle ....................... | 374/185 |
| 6,746,150 B2 | * | 6/2004 | Wienand et al. ......... | 374/208 |
| 6,829,820 B2 | * | 12/2004 | Adachi et al. ........... | 29/613 |
| 6,848,722 B2 | * | 2/2005 | Jeory ...................... | 285/305 |
| 6,860,635 B2 | * | 3/2005 | Muziol et al. ............ | 374/185 |
| 6,962,438 B2 | * | 11/2005 | Chu ........................ | 374/208 |
| 7,012,502 B2 | * | 3/2006 | Shibayama .............. | 338/28 |
| 2005/0175066 A1 | * | 8/2005 | Nakabayashi ........... | 374/148 |
| 2005/0175067 A1 | * | 8/2005 | Chu ........................ | 374/208 |

FOREIGN PATENT DOCUMENTS

| | | |
|---|---|---|
| JP | A-10-213491 | 8/1998 |
| JP | A-2002-243557 | 8/2002 |
| JP | A-2003-139622 | 5/2003 |

* cited by examiner

*Primary Examiner*—Gail Verbitsky
(74) *Attorney, Agent, or Firm*—Posz Law Group, PLC

(57) ABSTRACT

In a temperature sensor for an engine, abutting surfaces of two parts that form a compartment for a temperature sensing element of the sensor is interposed with a sealing material being compressed by an raised portion on one of the abutting surfaces to the other surface. Because the sealing material is in contact circularly with both of the two surfaces, that is, one between two concentric raised portions on one of the abutting surfaces and the other that confronts the former surface, a seal for the temperature sensing element can be kept for a long period of time even when the raised portions have a scratch.

12 Claims, 7 Drawing Sheets

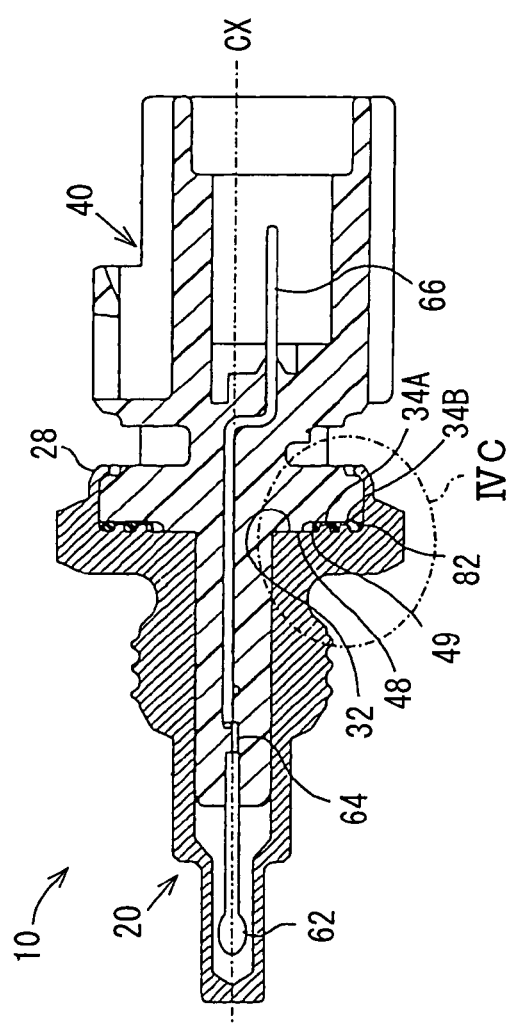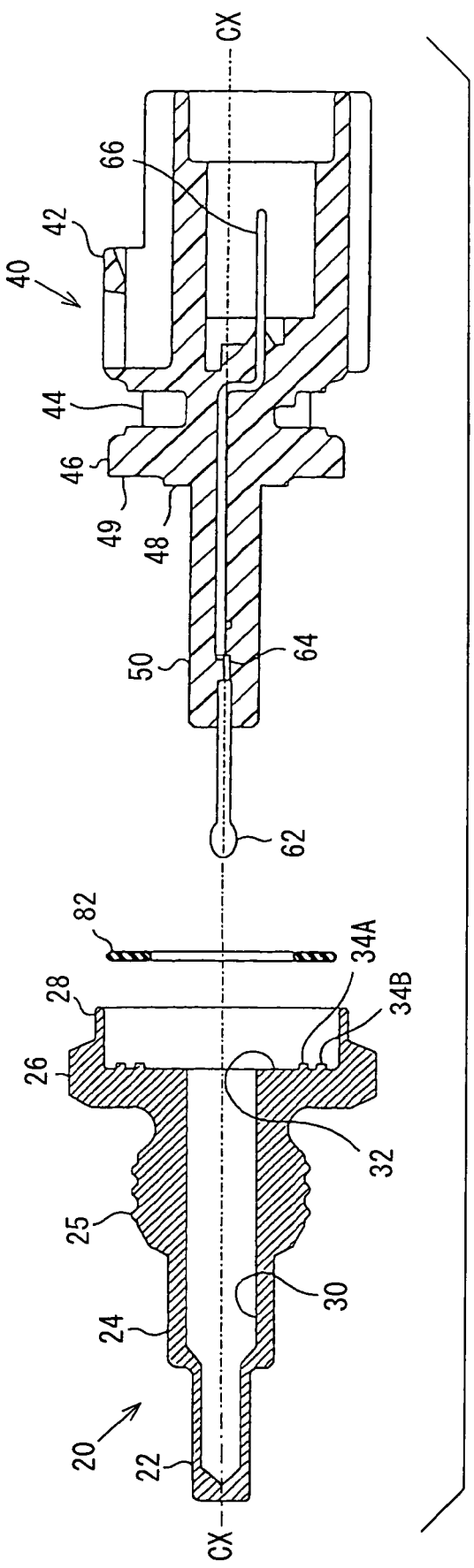
FIG. 3A
FIG. 3B

TEMPERATURE SENSOR

CROSS REFERENCE TO RELATED APPLICATION

This application is based on and incorporates herein by reference Japanese Patent Application No. 2004-43236 filed on Feb. 19, 2004.

FIELD OF THE INVENTION

The present invention relates to a temperature sensor that includes two parts, that is, a metal housing having a cylindrical pointed end, a crimping rear end and an axial hollow space in between, and an element support part having a support portion, a flange portion and a connector portion. The metal housing covers the element support part that has a temperature sensing element disposed thereon, with the crimping rear end sealing the flange portion of the element support part.

BACKGROUND OF THE INVENTION

A temperature sensor, which is conventionally used for detecting an engine coolant temperature, is shown in FIG. 7A. The temperature sensor has a housing 120, as shown in FIG. 7C, made of brass being engaged to an element support part 140 made of resin. The housing 120 comprises a cylindrical pointed end 122 that accommodates a temperature sensing element 62, a crimping rear end 128, and a hollow space 130 that is perforated axially aligning with an axis CC of the temperature sensor. The element support part 140 includes a support portion that supports the temperature sensing element 62 in the hollow space 130, a flange portion 146 that is sealed by the crimping rear end 128, and a connector portion 142 for electrical connection with an external controller, etc.

A circled portion VIIB in FIG. 7A is expansively shown in FIG. 7B. A gap between the housing 120 and the element support part 140 is sealed by a sealing ring 82 that interposes between an abutment surface 132 of the housing 120 and a recess portion 149 recessing from an abutting front surface 148 of the flange portion 146.

Sealing structures of a temperature sensor is disclosed in Japanese patent documents such as JP-A-2003-139622, JP-A-10-213491, and JP-A-2002-243557.

When the housing 120 has a dent or a scratch on the abutment surface 132 in contact with the sealing ring 82, as shown in FIG. 7B, it cannot protect the temperature sensing element 62 from an outside water. As a result, the element 62 will be corroded by the water permeating from the crimping portion 128. The housing 120, being made of brass for the ease of processing, is prone to a scratch. Further, the housing 120 is easily scratched on the abutment surface 132 by the cylindrical pointed end 122 of other housings 120 when being handled untidily during conveyance. This leads to the loss of hermetic contact described above. Each housing 120 is thus being conveyed in a case with the pointed end 122 inserted in a separate hole in the case. Inserting each housing 120 in a hole is a troublesome task.

SUMMARY OF THE INVENTION

The present invention, in view of the above problems, devises a temperature sensor that provides a durable seal for a temperature sensing element in its inner portion.

The inventive structure prevents the temperature sensor from losing a seal for the inner portion by disposing a structure on an abutment surface between two parts that form a compartment for the inner portion of the sensor.

In order to achieve the above-described objectives, the temperature sensor comprises two parts, that is, a metal housing and an element support part. The metal housing has a cylindrical pointed end, a crimping rear end and a hollow space axially perforated along an axis of the housing. The element support part has a support portion for supporting a temperature sensing element, a flange portion for being crimped by the crimping rear end, and a connector portion for wiring.

The metal housing has an abutment surface in the proximity of the inner circumference of the crimping rear end, and the surface is perpendicular to the axis of the temperature sensor. The flange portion of the element support part has an abutting front surface that contacts the abutment surface of the metal housing, and a recess portion that recesses from the abutting front surface. Further, a circular raised part is disposed on the abutment surface in a position confronting the recess portion, and a sealing material interposes between the circular raised part on the abutment surface and the recess portion.

The raised part on the abutment surface may also be in a small hemispherical shape, arranged in a circle around the axis of the sensor. In this case, the sealing material also interposes between the raised part on the abutment surface and the recess portion.

The temperature sensor in the present invention can seal the inner portion by a sealing material interposing between the circular raised part on the abutment surface of the metal housing and the recess portion of the flange portion. The inner portion of the temperature sensor can be kept sealed owing to the sealing material even when the circular raised part has a scratch on it. In other words, the scratch on the raised part caused by the cylindrical pointed end of other sensors during conveyance in an untidy manner does not deteriorate the seal of the inner portion of the sensor. As a result, each metal housing needs not be held in a separate case during conveyance.

The structure of the raised portion on the flange portion may be varied from a single circular shape to double circular shapes, or a small hemispherical shape arranged in plural concentric circles. The raised portion of double circular shape, or the raised portion of the small hemispherical shapes arranged in circles further lessen a possibility of having a scratch on the abutment surface during conveyance, because the cylindrical pointed end of the metal housing will not reach the surface between the two raised circles or two raised hemispherical shapes if an interval and a height of the two raised structure are appropriate. As a result, each metal housing needs not be held in a separate case during conveyance.

An interval Y and a height Z of the two raised structure, that is, double circular shapes in this case, are determined by the following formula in proportion to a diameter X of the cylindrical pointed end of the metal housing. The formula is:

$$Z > X/2 - \sqrt{(X/2)^2 - (Y/2)^2} \quad \text{[Formula]}$$

When the interval and the height of the two circular portions raised on the abutment surface are defined according to the above formula, the cylindrical pointed end does not reach the surface between the two circular portions, and thus surface is protected from having a scratch. As a result, each metal housing need not be held in a separate case during conveyance.

BRIEF DESCRIPTION OF THE DRAWINGS

The above and other objects, features and advantages of the present invention will become more apparent from the following detailed description made with reference to the accompanying drawings. In the drawings:

FIG. 3A is a cross-sectional view of the temperature sensor along the IIIA—IIIA line in FIG. 2A.

FIG. 3B is a cross-sectional exploded view of the temperature sensor, consisting of three parts, that is, a metal housing, a sealing ring, and an element support part.

DETAILED DESCRIPTION OF THE PREFERRED EMBODIMENT

The present invention will be described in detail with respect to a temperature sensor in which an inner portion for a temperature sensing element is fluid-tightly sealed.

First Embodiment

A temperature sensor in the present embodiment, as shown in FIG. 1A to FIG. 5, has a structure for sealing a temperature sensing element contained therein.

Figure 1A:
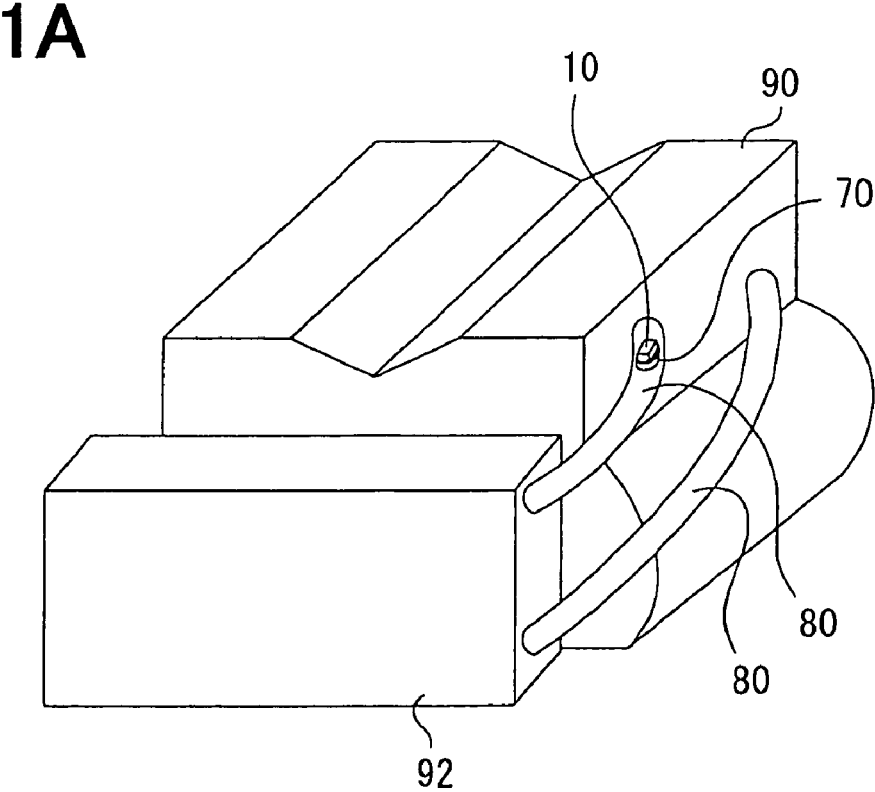
FIG. 1A is a schematic perspective view of a temperature sensor disposed on a coolant pipe in the first embodiment.

A schematic perspective view of the temperature sensor disposed on a coolant pipe in the first embodiment is shown in FIG. 1A. There are two coolant pipes 80 connecting an engine 90 and a radiator 92, and the coolant cooled in the radiator 92 is provided to the engine 90 through the pipe 80. One of the coolant pipes 80 has a receptacle bushing 70, where the temperature sensor 10 is disposed.

Figure 1B:
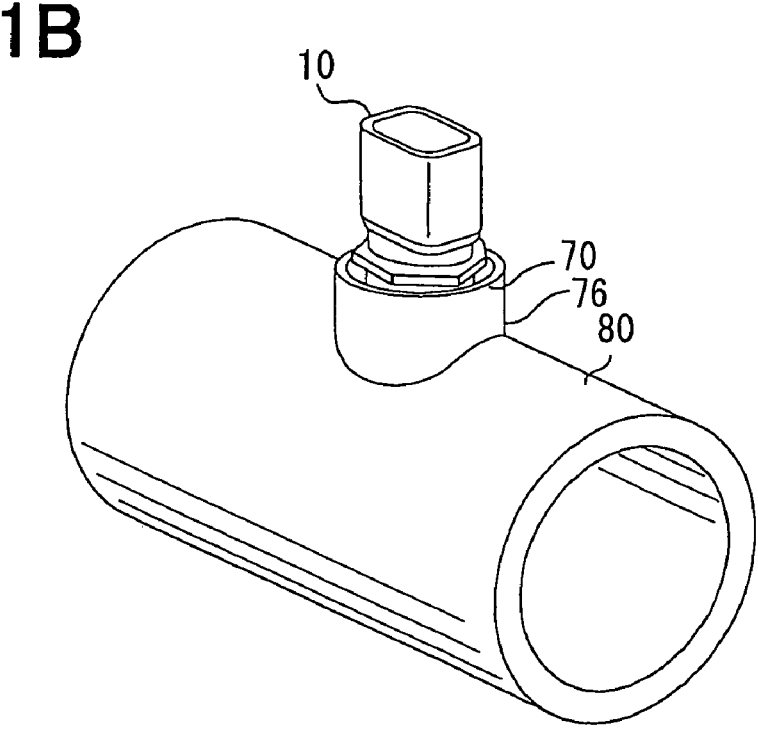
FIG. 1B is a schematic perspective view of the temperature sensor disposed on a receptacle bushing in the first embodiment.

A schematic perspective view of the temperature sensor disposed on the receptacle bushing 70 is shown in FIG. 1B. The receptacle bushing 70 has a cylindrical wall 76 extending perpendicularly from the coolant pipe 80. The temperature sensor 10 is disposed on the receptacle bushing 70 concentrically. A wire harness is connected to the top of the temperature sensor 10 through a connector (not shown in FIG. 1B), so that the sensor 10 is used to send off a temperature signal to an engine control unit (ECU).

Figure 2A:
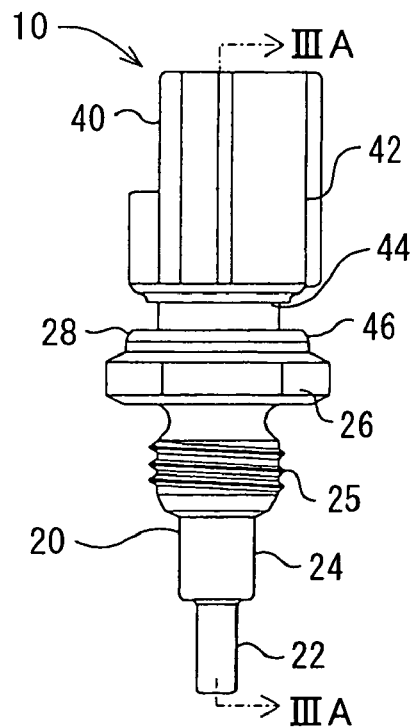
FIG. 2A is a side view of the temperature sensor.
Figure 2B:
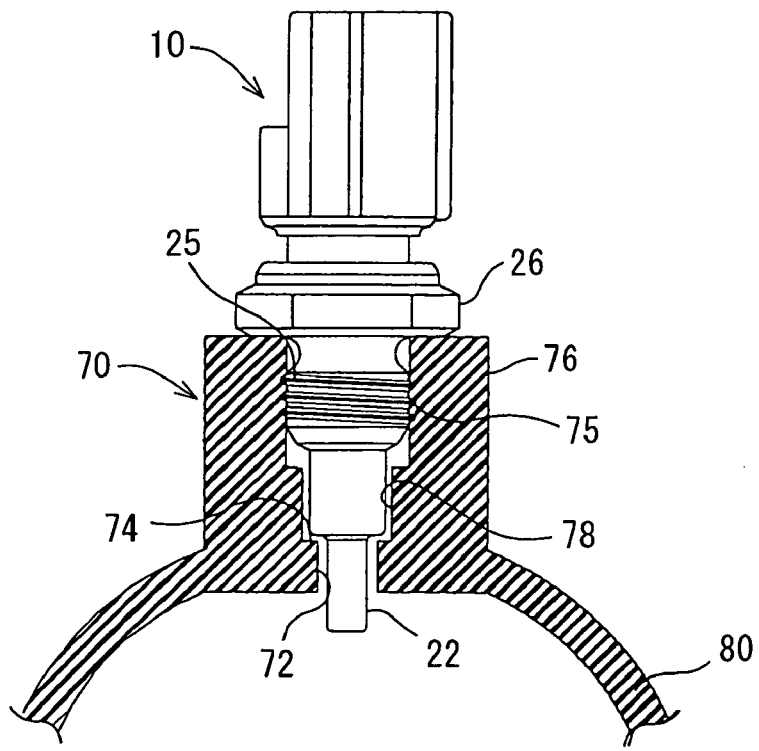
FIG. 2B is a cross-sectional view of the receptacle bushing with the temperature sensor being disposed thereon.

A side view of the temperature sensor 10 is shown in FIG. 2A, and a cross-sectional view of the receptacle bushing 70 with the temperature sensor 10 being disposed thereon is shown in FIG. 2B.

The temperature sensor 10, as shown in FIG. 2A, comprises a cylindrical pointed end 22 that accommodates a temperature sensing element (not shown in FIG. 2A) in a pointed portion, a cylindrical widened portion 24 that supports the pointed end 22, a screw portion 25 with a thread, a nut portion 26 of a hexagonal shape, a crimping portion 28 adjacent to the nut portion 26, a cervical portion 44 with a decreased diameter, and a connector portion 42 for wiring (not shown in FIG. 2A).

The receptacle bushing 70, as shown in FIG. 2B, has a cylindrical wall 76 perpendicular to the longitudinal axis of the coolant pipe 80 and a bottom portion 74. A through hole 72 for the pointed end 22 of the temperature sensor 10 is disposed at the center of the bottom portion 74. A cylindrical narrowed portion 78 having a decreased inner diameter is disposed on the bottom portion 74 side of the cylindrical wall 76. A screw portion 75, upward from the narrowed portion 78, is disposed in order to engage the screw portion 25 on the temperature sensor 10.

The temperature sensor 10 is fixed on the receptacle bushing 70 with the screw portion 25 threaded into the screw portion 75 on the receptacle bushing 70, by rotating the hexagonal nut portion 26 using a wrench, having the temperature sensor 10 inserted in the receptacle bushing 70.

FIG. 3A shows a cross-sectional view of the temperature sensor in FIG. 2A along the IIIA—IIIA line, and FIG. 3B shows a cross-sectional view of the components of the temperature sensor 10, that is, a metal housing 20, a sealing ring 82, and an element support part 40. The following description of various portions in the housing 20 and the part 40 is developed in order from a 'frontal' portion towards a 'rear' end, that is, from left to right in FIG. 3A and FIG. 3B.

The brass housing 20 engages, as shown in FIG. 3B, the resin element support part 40 with the interposing sealing ring 82 to form the temperature sensor 10 in FIG. 3A. The housing 20 comprises the cylindrical pointed end 22 that accommodates a temperature sensing element 62 in the pointed portion, a cylindrical widened portion 24 that supports the pointed end 22, a screw portion 25 having a thread on its surface, a nut portion 26 in a hexagonal shape, a crimping rear end 28, and an axial hollow space 30 perforated along an axis CX. An abutment surface 32 is disposed in the proximity of an inner circumference of the crimping rear end 28 perpendicularly to the axis CX. The abutment surface 32 has circular raised parts 34A and 34B protruding towards the rear end of the housing, arranged concentrically in a position confronting a recess portion 49 on the element support part 40 (described later in this embodiment).

The element support part 40, on the other hand, has a support portion 50 that supports the temperature sensing element 62 to be inserted in the hollow space 30 of the housing 20, a flange portion 46 that engages the crimping rear end 28, and a connector portion 42 for wiring. The flange portion 46 has an abutting front surface 48 that is disposed perpendicularly to the axis CX at the rear end of the support portion 50, and a recess portion 49 that recesses from the abutting surface 48 towards the rear end of the support part 40. The recess portion 49 is perpendicular to the axis CX and plane as the abutting surface is. When seen from the front of the support part 40, the abutting surface 48 and the recess portion 49 are both concentrically circular around the support portion 50, and arranged in order from an inner circumference to a periphery. The connector portion 42 has a terminal 66 that is connected to the temperature sensing element 62 by a signal wire 64. The terminal 66 is connected to a wiring harness through a connector (not shown in FIG. 3B) to send off a temperature signal to the ECU.

As shown in FIG. 3A, the housing 20 engages the element support part 40 by interposing the sealing ring 82 to the abutment surface 32 of the housing 20. The crimping rear end 28 of the housing 20 is then crimped to the flange portion 46 of the element support part 40, as shown in FIG. 3A, with the support portion 50 of the element support part 40 being inserted in the hollow space 30. The crimping rear end 28, originally straight as in FIG. 3B, is bent along the periphery of the flange portion 46 to tightly seal the housing 20 with the element support part 40. The sealing structure of the temperature sensor 10 is further described in detail.

Figure 4A:
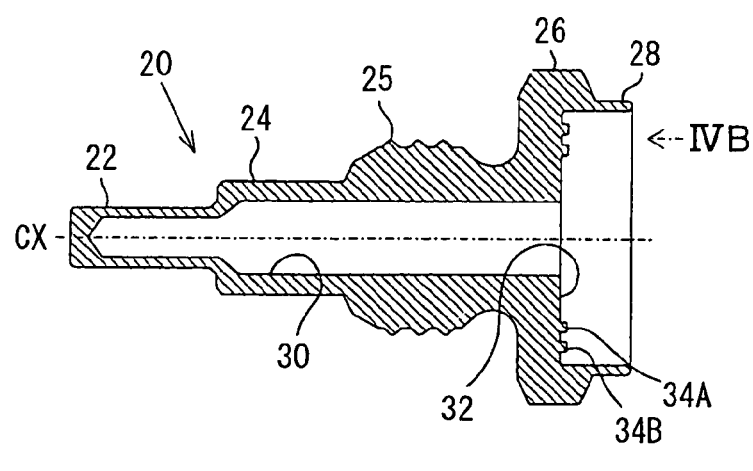
FIG. 4A is a cross-sectional view of the metal housing in the first embodiment.
Figure 4B:
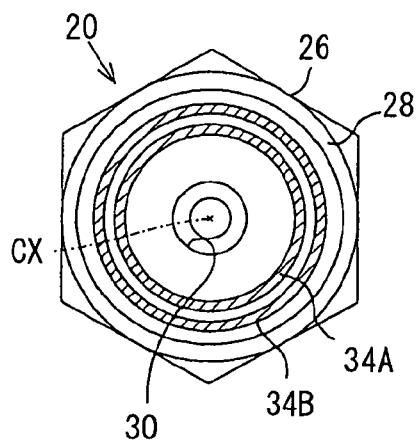
FIG. 4B is an end view of the metal housing shown in FIG. 4A seen from IVB side in the first embodiment.
Figure 4C:
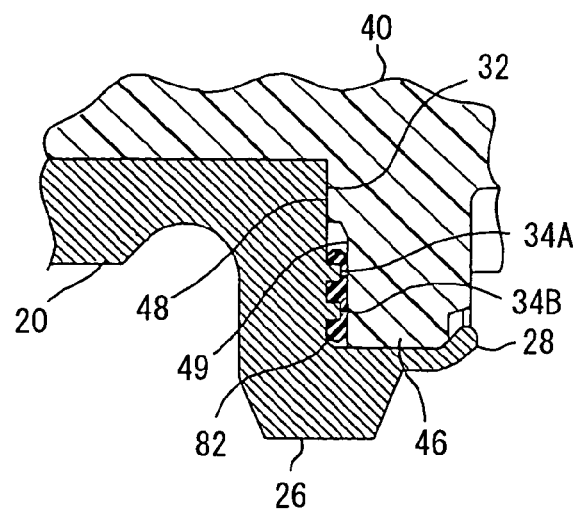
FIG. 4C is an expanded cross-sectional view of a circled part IVC in FIG. 3A in the first embodiment.

FIG. 4A shows a cross-sectional view of the housing 20, and FIG. 4B shows an end view of the housing 20. FIG. 4C shows an expanded cross-sectional view of the housing 20 designated as a circle IVC in FIG. 3A.

The circular raised parts 34A and 34B, as shown in FIG. 4B, are concentrically formed at the axis CX. The circular raised parts 34A and 34B are cut from the axially rotating housing 20 by a bit.

The circular raised parts 34A and 34B disposed on the abutment surface 32 are in a position that confronts the plane surface of the recess portion of the element support part 40. The sealing ring 82 made of resin interposes in a space between the periphery of the abutment surface 32 and the recess portion 49 when the inner circumference of the abutment surface 32 of the housing 20 and the abutting front surface 48 of the element support part 40 is in contact.

The temperature sensor 10 in the first embodiment has the interposing sealing ring 82 between the recess portion 49 and the circular raised part 34A. This ensures a seal of the inner portion of the temperature sensor 10 even if the raised portion 34A has a scratch on it. Therefore, an untidily conveyed metal housing 20, with a scratch on the raised portion 34A made by the pointed end 22 of the other housing 20 during conveyance, can securely keep the inner portion of the temperature sensor 10 sealed. This is because the sealing ring 82 is in contact with the abutment surface 32. An inventive structure in the first embodiment, that is, the two raised parts 34A and 34B confronting to the recess portion 49 with the interposing sealing ring 82 has an advantage in terms of sealing the inner portion of the sensor 10, even if the raised portion 34A has a scratch. Consequently, the housing 20 can be handled without being cased separately during conveyance. This decreases time and cost for handling the metal housing 20.

Further, a highly compressed portion in the sealing ring 82, which is in contact with the raised portion, contributes to extend a lifetime of the temperature sensor 10 by preventing the inner portion sealed from an outside water, even when the other portion of the sealing ring 82 loses elasticity from aging.

Figure 5:
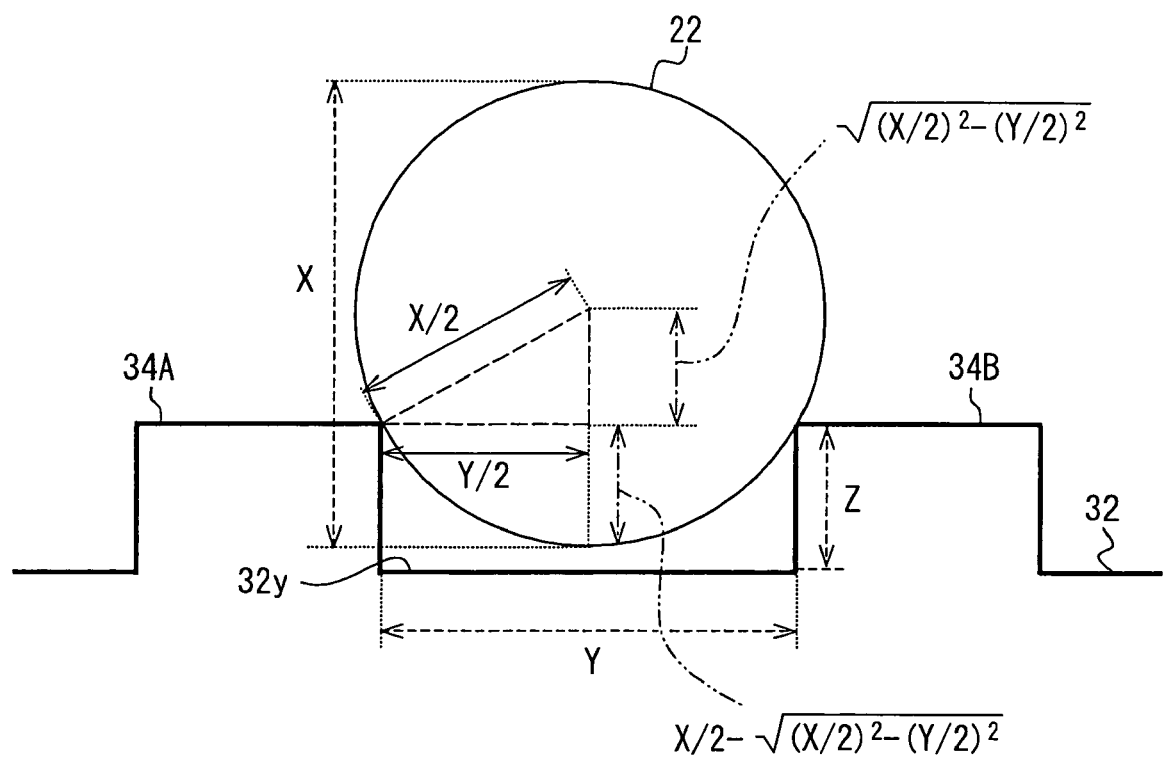
FIG. 5 is a schematic drawing that shows relationship between the diameter X of the cylindrical pointed end of the metal housing, and the interval Y/height Z of the circular raised part.

A position and a size of the circular raised parts 34A and 34B are described with reference to FIG. 5.

In the temperature sensor 10 of the first embodiment, the interval between the circular raised portions 34A and 34B is denoted as Y, the height of both raised portions is denoted as Z, and the diameter of the pointed end 22 is denoted as X.

When the height Z of the raised portions 34A and 34B is greater than the value derived from the following formula, the pointed end 22 can not reach the surface 32y between the two raised portions 34A and 34B, and thus the surface 32y is prevented from having a scratch during conveyance. Therefore, the seal of the temperature sensor 10 is secured even when the housing 20 is conveyed untidily.

$$Z > X/2 - \sqrt{(X/2)^2 - (Y/2)^2}$$ [Formula]

Second Embodiment

The temperature sensor 10 in the second embodiment is described with reference to FIG. 6.

Figure 6A:
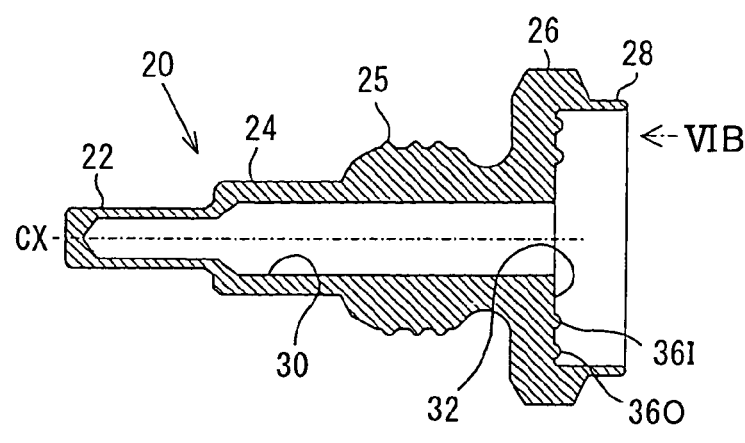
FIG. 6A is a cross-sectional view of the metal housing in the second embodiment along a VIA—VIA line in FIG. 6B.
Figure 6B:
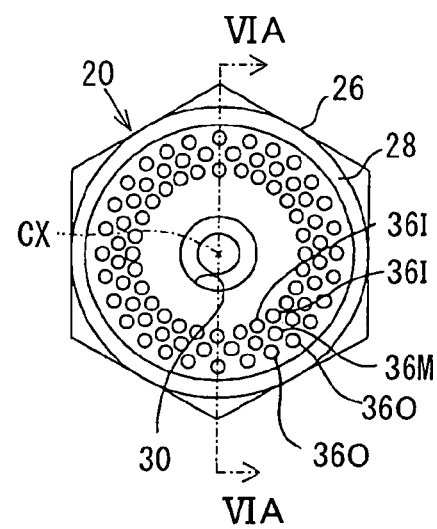
FIG. 6B is an end view of the metal housing shown in FIG. 6A seen from VIB side in the second embodiment.
Figure 6C:
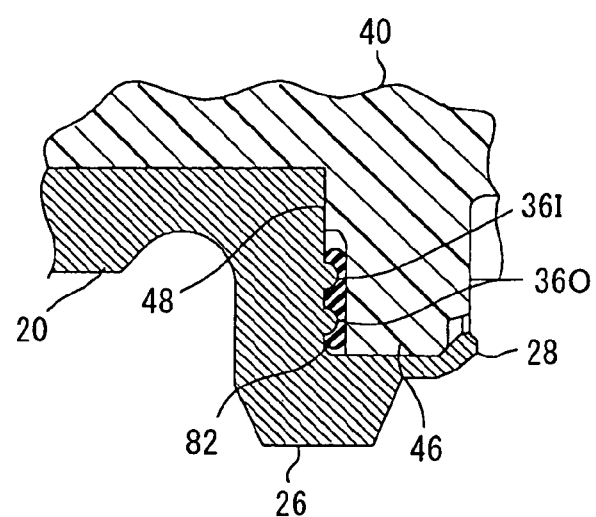
FIG. 6C is an expanded cross-sectional view of the area of abutment of the metal housing in the second embodiment.
Figure 7B:
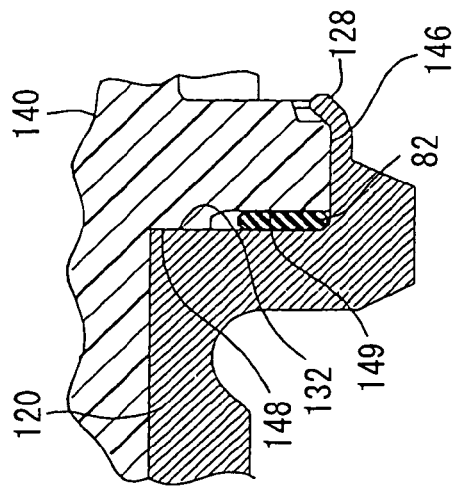
FIG. 7B is an expanded cross-sectional view of the sensor in a circled part VIIB in FIG. 7A.
Figure 7A:
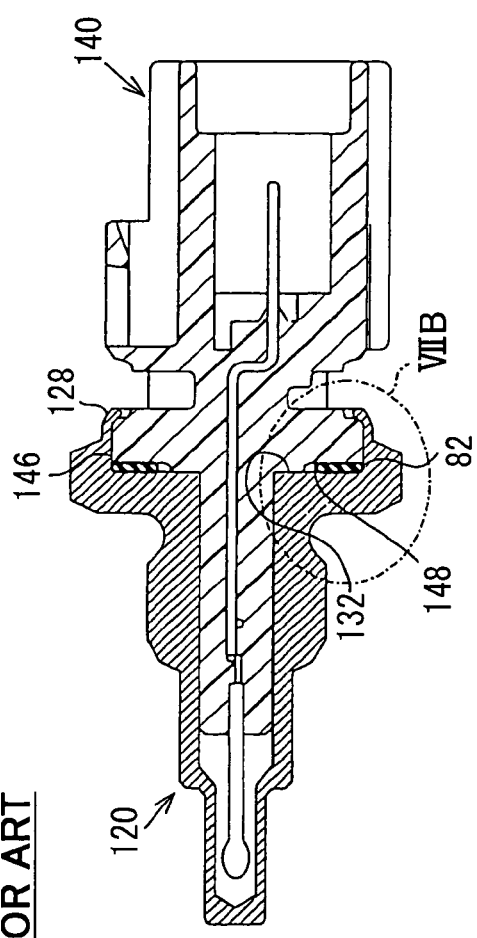
FIG. 7A is a cross-sectional view of a temperature sensor regarding a prior art.
Figure 7C:
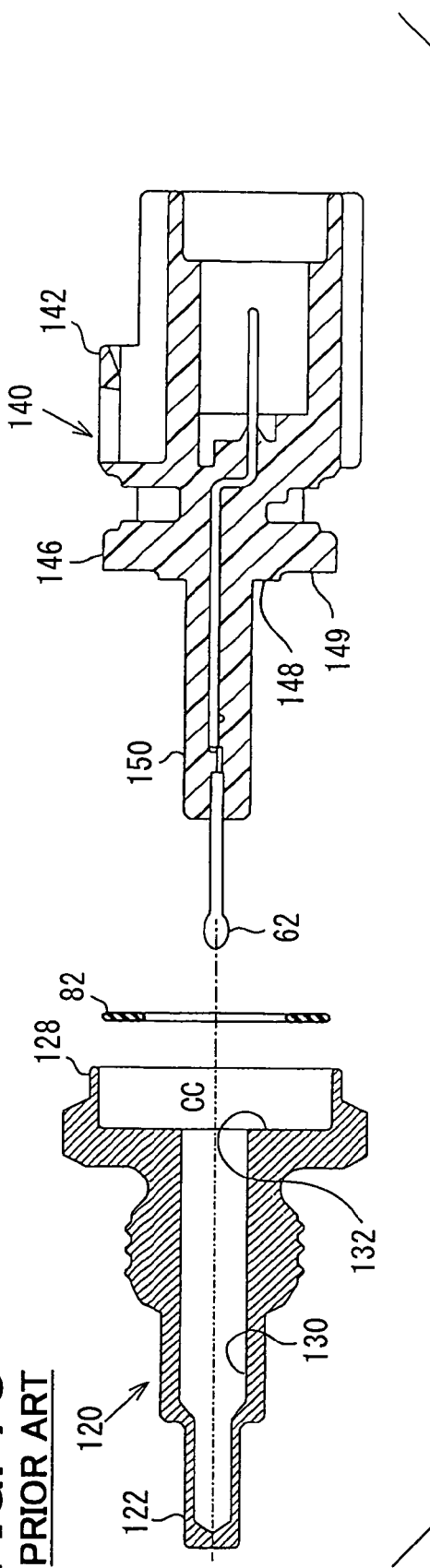
FIG. 7C is a cross-sectional exploded view of the temperature sensor regarding the prior art, consisting of three parts, that is, a metal housing, a sealing ring, and an element support part.

FIG. 6A shows a cross-sectional view of the housing 20 in the second embodiment, and FIG. 6B shows an end view of the housing 20. FIG. 6C shows an expanded cross-sectional view of an area of contact between the housing 20 and the element support part 40. FIG. 6A corresponds to a cross-section of the housing shown in FIG. 6B along the VIA—VIA line.

In the first embodiment, the circular raised portions 34A and 34B are formed on the abutment surface 32 of the housing 20. In the second embodiment, hemispherically raised portions 36I, 36M and 36O are formed in the same place, that is, on the abutment surface 32 of the housing 20, protruding towards the rear end of the housing 20 and confronting the recess portion 49 of the element support part 40. The raised portions 36I, 36M and 36O are, as shown in FIG. 6B, arranged in three circles concentrically around the axis CX. The raised portions 36M, arranged in a circle radially between two concentric circles of the raised portions 36I and 36O, are so located that one raised portion 36M comes circumferentially between the two raised portions 36I on an inner circle and the two raised portions 36O on an outer circle.

The temperature sensor 10, in the second embodiment, has two abutting surfaces, one on the housing 20 and one on the element support part 40, interposed by the sealing ring 82. That is, the flange portion 46 of the element support part 40 has the recess portion 49 recessing from the abutting front surface 48, and the abutment surface 32 of the metal housing 20 has hemispherically raised portions 36I, 36M and 36O. The interposing sealing ring 82 between these two surfaces can keep the inner portion of the temperature sensor 10 sealed, even when the raised portions 36I, 36M and 36O have a scratch on them because of the elastic contact of the sealing ring 82 to these surfaces. The concentrically circular arrangement of the hemispherically raised portions 36I, 36M and 36O creates the same effect as the raised portions 34A and 34B do in the first embodiment. Therefore, an untidily conveyed metal housing 20 in the second embodiment, with a scratch on the raised portions 36I, 36M and 36O made by the pointed end 22 of the other housing 20 during conveyance, can securely keep the inner portion of the temperature sensor 10 sealed. Consequently, the housing 20 may be handled without being cased separately during conveyance. This decreases time and cost for handling the metal housing 20.

USABILITY/INDUSTRIAL APPLICABILITY

In the embodiments described above, an inventive structure of the present invention is applied to a temperature sensor of a coolant. However, the structure can also be applied to various kinds of sensors that sense the temperature of liquid passage such as the oil temperature and the like. Further, though the number of the circular raised portions is specified as two in the first embodiment, the number may be increased as long as at least one circular raised portion is formed. Furthermore, the sealing ring in the above embodiment may be replaced with a sealing material such as a sealing gasket, O ring or the like.

What is claimed is:

1. A temperature sensor, comprising:
   a metal housing having a tubular end accommodating a temperature sensing element, a crimping rear end, and an axial hollow space in the tubular end and the crimping rear end;
   an element support part engaged to the metal housing having a support portion supporting the temperature sensing element inserted in the axial hollow space, a flange portion being crimped by the crimping rear end of the metal housing; and
   a connector portion enclosing wiring of the temperature sensing element,
   wherein the metal housing has an abutment surface in a proximity of an inner circumference of the crimping rear end disposed perpendicular to an axis of the sensor,
   wherein the flange portion of the element support part has an abutting front surface facing the abutment surface, and a recess portion recessing from the abutting front surface towards the rear end of the sensor,
   wherein at least two discrete raised parts protruding towards the rear end of the sensor are disposed on the abutment surface in a position facing the recess portion,
   wherein a sealing material interposes between the recess portion and the at least two raised parts, and
   wherein the sealing material contacts an upper surface of each of the at least two raised parts and a surface of the abutment surface between the at least two raised parts.

2. The temperature sensor of claim 1, wherein the at least two raised parts disposed on the abutment surface are circular.

3. The temperature sensor of claim 1, wherein the tubular end of the metal housing is in a cylindrical pointed shape.

4. The temperature sensor of claim 3, wherein an interval Y of the at least two raised parts, a height Z of the at least two raised parts and the diameter X of the cylindrical pointed end fulfill the following formula:

$$Z > X/2 - \sqrt{(X/2)^2 - (Y/2)^2}.$$ [Formula]

5. The temperature sensor of claim 2, wherein the at least two raised parts are disposed in a concentrically circular arrangement about an axis of the axial hollow space.

6. The temperature sensor of claim 2, wherein the at least two raised parts are hemispherically raised.

7. The temperature sensor of claim 1, wherein the at least two raised parts are hemispherically raised.

8. A temperature sensor, comprising:
   a metal housing having a tubular end accommodating a temperature sensing element, a crimping rear end, and an axial hollow space in the tubular end and the crimping rear end, wherein the tubular end of the metal housing is in a cylindrical pointed shape;
   an element support part engaged to the metal housing having a support portion supporting the temperature sensing element inserted in the axial hollow space, a flange portion being crimped by the crimping rear end of the metal housing; and
   a connector portion used for wiring,
   wherein the metal housing has an abutment surface in a proximity of an inner circumference of the crimping rear end disposed perpendicular to an axis of the sensor,
   wherein the flange portion of the element support part has an abutting front surface facing the abutment surface, and a recess portion recessing from the abutting front surface towards the rear end of the sensor,
   wherein a discrete raised part protruding towards the rear end of the sensor is disposed on the abutment surface in a position facing the recess portion, and
   wherein a sealing material interposes between the recess portion and the raised part,
   wherein an interval Y of the two raised parts, a height Z of the two raised parts and the diameter X of the cylindrical pointed end fulfill the following formula:

$$Z > X/2 - \sqrt{(X/2)^2 - (Y/2)^2}.$$ [Formula]

9. The temperature sensor of claim 8, wherein the at least two raised parts disposed on the abutment surface are circular.

10. The temperature sensor of claim 9, wherein the at least two raised parts are disposed in a concentrically circular arrangement about an axis of the axial hollow space.

11. The temperature sensor of claim 9, wherein the at least two raised parts are hemispherically raised.

12. The temperature sensor of claim 8, wherein the at least two raised parts are hemispherically raised.

* * * * *